(12) United States Patent
Schubert

(10) Patent No.: US 7,171,812 B2
(45) Date of Patent: Feb. 6, 2007

(54) ELECTRIC GENERATION FACILITY AND METHOD EMPLOYING SOLAR TECHNOLOGY

(75) Inventor: Frank Schubert, Denver, CO (US)

(73) Assignee: Powerstreams, Inc., Englewood, CO (US)

( * ) Notice: Subject to any disclaimer, the term of this patent is extended or adjusted under 35 U.S.C. 154(b) by 0 days.

(21) Appl. No.: 10/801,914

(22) Filed: Mar. 15, 2004

(65) Prior Publication Data

US 2005/0198959 A1   Sep. 15, 2005

(51) Int. Cl.
*B60K 16/00* (2006.01)
(52) U.S. Cl. .................................. 60/641.15; 60/641.8
(58) Field of Classification Search ............... 60/641.8, 60/641.15
See application file for complete search history.

(56) References Cited

U.S. PATENT DOCUMENTS

| | | | | |
|---|---|---|---|---|
| 4,055,948 A | * | 11/1977 | Kraus et al. ............... | 60/641.8 |
| 4,977,744 A | * | 12/1990 | Lenz ....................... | 60/641.15 |
| 5,685,151 A | * | 11/1997 | Ross ........................ | 60/641.8 |
| 6,668,555 B1 | * | 12/2003 | Moriarty ................... | 60/641.8 |

* cited by examiner

Primary Examiner—Hoang Nguyen
(74) Attorney, Agent, or Firm—Timothy J. Martin; Michael R. Henson; John W. Carpenter

(57) ABSTRACT

An electric generation station employs a solar array to heat a thermal transfer fluid that is supplied to a heat exchanger to produce steam. The heated steam drives a steam engine that operates either an electric generator to produce electricity or a pump assembly. The pump assembly can pump water to an elevated location for use during peak times by flowing water downwardly past an electric generator. The electric generators can be pelton turbines. One or more thermal fluid storage facilities can be used to store heated fluid, and heat may also be stored in a heat retaining material. Additional optional features and combinations of optional assemblies are disclosed. A method of generating electricity with these systems is also described.

15 Claims, 5 Drawing Sheets

ELECTRIC GENERATION FACILITY AND METHOD EMPLOYING SOLAR TECHNOLOGY

FIELD OF THE INVENTION

The present invention broadly relates to energy sources and, in particular, to production facilities for generating electricity. More specifically, the present invention concerns the production of electricity by means of solar power. This invention is also directed to electric generation facilities and methods wherein electricity may ultimately be generated from solar power, but wherein the time of day during which production of such electricity occurs may be selected.

BACKGROUND OF THE INVENTION

The very process of life relies upon the presence of a source of energy. This energy ultimately derives from thermonuclear processes occurring in the sun that create energy in the form of electromagnetic radiation in the form of light. This electromagnetic energy may then be converted into other forms of energy by a variety of processes.

For example, such solar energy may cause evaporation of water such that the water vapor is transported from a lower elevation to a higher elevation thereby increasing its potential energy. A variety of chemical and biochemical processes may store solar energy in various chemical bonds for subsequent exothermic release in a plethora of chemical reactions and life processes. Solar energy, itself, can cause excited mechanical states resulting in the direct heating due to mechanical vibration, osculation and the like.

With the rise of civilizations, humankind has sought ways of tapping or otherwise harnessing available energy sources ultimately to increase the comfort and well being of the species. Early on, of course, organic materials were burned such that, through oxidation, stored chemical energy was released in order to heat the environment, to cook food, etc. Later, humankind learned to utilize the kinetic energy of flowing waters in streams and rivers to provide power for a variety of mechanical tasks. The power of wind was also used as a source of energy, tapped by a windmill, in order to pump water or operate other mechanical equipment and devices.

With the increasing understanding of electricity during the mid-1800's, a versatile source of energy was realized. Over the course of years, it was learned that the electromagnetic properties associated with electricity have almost limitless applications to everyday life. On one hand, electrical energy could be stored chemically in batteries so as to be available on demand. On the other hand, electrical energy was easily distributed over conductive transmission lines so that individual homes and businesses could have a versatile source of power on location. Indeed, the world as we know it today unquestionably derives from the development and understanding of electrical power.

For a long time, two major processes were used to produce electrical power for distribution over various power grids so as to be accessible by large populations of people. The first of these is known as hydroelectric generation wherein the kinetic energy associated with flowing water as it moves from a higher potential energy state to a lower potential energy state could be used to drive an electrical generator. That is, this kinetic energy could be used to rotate magnets and electrical coils so as to induce electricity in such coils, as is the known structure in an electric generator. Accordingly, hydroelectric dams were constructed to confine water as a potential energy source and to controllably release the water to mechanically turn generators, as described. Such hydroelectric generation facilities have positive attributes of being a relatively clean source of electricity although they have a disadvantage in the potential ecological impact associated with altering the natural flow of rivers and streams.

A second technique that was developed at an early date was chemical based electrical generation plants. Here, organic materials, such as coal, could be burned to release their chemical energy which energy could be converted through a variety of means, such as steam engines and the like, in order to mechanically drive generators to produce the ultimately desired electric power. Chemical plants add the attraction of being more versatile in their site location since the location of such generation plants were not dependant upon the presence of a large source of flowing water. However, such chemical plants have severe drawbacks due to the pollutants produced from the burning of large amounts of organic materials. Such pollutants include those particulate matter and undesirable molecular byproducts that have been traditionally exhausted into the environment. Again, ecological damage results.

In the mid 20th century, a new hope for a source of power appeared. At this time, the scientific community began more thoroughly to understand various thermonuclear processes similar or the same as those occurring in the sun. The breakthroughs in the understanding of the physics of thermonuclear processes led to the realization that energy could be directly derived either from the nuclear fission of certain naturally occurring materials (such as various forms of uranium) or from manmade materials (such as plutonium). Alternatively, it was recognized that even greater amounts of energy could be obtained from the thermonuclear fusion of certain materials, such as certain isotopes of hydrogen into a resultant helium, such as occurs in the sun. The efforts to harness thermonuclear fusion met with some success, and nuclear powered generation plants began to be erected. In such plants, the heat generated by the fission process was employed to produce steam, and this steam in turn was used to produce electricity for the power grid.

Towards the end of the 20th century however, nuclear power facilities began to fall into disfavor for their potential cataclysmic effects on the environment. Whereas, if properly controlled and monitored, such facilities could provide relatively clean electricity, human error and the natural deterioration of mechanical systems created the specter of a failure of containment of the thermonuclear process. The result of loss of containment was understood to have potential catastrophic results on the environment through widespread radiation contamination and the potential medical threat to large populations of humans. Moreover, such thermonuclear production facilities produced byproducts in the form of spend nuclear materials the storage of which presents significant challenges.

While thermonuclear fusion still appears to be a promising source of energy, science has not yet learned how to harness and control the production of energy from this awesome physical phenomenon. Efforts are directed to this source of energy on one hand due to the greater amounts of energy occurring in a fusion reaction and, on the other hand, due to the lack of radioactive contamination in a basic hydrogen to helium fusion. While there are those who believe that the fusion process will ultimately solve the world's energy needs, that solution remains elusive.

Accordingly, there are continued efforts to develop clean sources of electricity. For example, wind farms have been constructed wherein technologically advanced windmills are used to convert the kinetic energy of wind into mechanical energy that drive generators for the power grid. Experiments to utilize geothermal heat sources in order to derive electrical production facilities have also been explored, and there have even been efforts to exploit the movement through tides in the ocean as a possible power source for electrical generation.

A substantial amount of development has occurred in employing the solar energy, itself, to more directly generate electricity. Such development has primarily been in two directions. A first direction simply concentrates the electromagnetic energy associated with light from the sun to heat fluids to a high enough level so that they may be used to produce steam, and the steam may be used to generate electricity. Alternatively, substantial development efforts have been devoted to employ the photoelectric effect for the direct conversion of sunlight into electricity since it is known some materials or combinations of materials produce electricity directly upon the exposure to sunlight.

While solar energy presents the opportunity for perhaps the cleanest of all production of electricity, it nonetheless has drawbacks associated with efficiency and weather. First, the production of electricity, for example, from photoelectric cells, has not yet achieved high efficiency levels although there are increasing improvements into photoelectric that address this efficiency problem. Even so, such materials currently are relatively expensive so that the production of electricity from solar cells involves a high capital expenditure. In either of the cases of solar cells or solar collectors, it is better to have unobstructed radiation from the sun so that production of electricity from solar facilities may be seriously impacted by inclimate weather. Accordingly, solar facilities may only have applicability in environments that enjoy a large number clear days.

Regardless of the source of electricity on the power grid, it is well documented the consumption demands on the grid are not constant either on a day-to-day basis or throughout any given day. This is quite understandable when consideration is given to consumption pressures on various users on the grid. For example, on summer days wherein the temperature is elevated, there is a high demand on the grid for the use of electricity for air conditioners both residential and commercial. In the evening, there is a higher consumption of electricity for use in lighting. This consumption, however, drops off in the late evening and through the night when people are in bed. Accordingly, there are peak demands on any power grid, the occurrence of which can depend upon a variety of circumstances.

Since many electrical generation facilities produce electricity at a constant level, there are times for any given grid wherein the consumption of electricity may be lower than the ability of the facilities to output power but in many cases the consumption exceeds the capacities of the grid to produce. Accordingly, a particular power grid must acquire additional electricity to meet its demands. Where a power grid purchases electricity from other grids, it is well known that the price per unit can soar to many times the cost of a unit during non-peak demand.

It is also known that a better balance between consumption and demand can be met by storing the capability to produce additional electricity during peak demand times. For example, a production facility known as a "peak power pump storage facility" has been employed, and such facilities are usually associated with hydroelectric generation. Here, during times of diminished demand, the excess production capability will be used to pump water from a low elevation water source, typically the river on which the hydroelectric facility is located, to a higher elevation, such a storage reservoir. Thereafter, in time of peak demand, the stored water from the reservoir will be released through additional electric generators in an effort to meet the increased demand.

Despite the development of a wide variety of technology in the area of electric power generation, there remains a need for improved systems which can produce power for use on a power grid. There is a further need for power systems that can better respond to peak demands on the grid. In addition, there remains a need for integrated systems so as to provide the production of electricity in an increasingly safe and environmentally clean manner. The present invention is directed to meeting such needs.

SUMMARY OF THE INVENTION

It is an object of the present invention to provide a new and useful electric generation system and method which can produce electricity in an environmentally clean manner.

It is another object of the present invention to provide an improved system and method for producing electricity from solar energy.

Still a further object of the present invention is to provide a system and method for producing electricity which can take advantage of the economies of peak demand in order to supply electricity to a power grid during times of peak demand.

Yet a further object of the present invention is to provide electrical generation facilities that can be customized for different power outputs, such as small communities and the like.

Yet a further object of the present invention is to provide an electrical generation system that is relatively inexpensive from a capital cost utilizing existing technologies in a new and nonobvious manner.

According to the present invention, then, an electric generation station is provided in order to selectively generate electricity for a power grid. Broadly, the electric generation station includes a solar array that has a transfer fluid and that is operative in response to solar energy to heat the transfer fluid to a substantially elevated temperature. A heat exchanger is in fluid communication with the transfer fluid and is operative to produce steam in response to circulation of heated transfer fluid therethrough. A first pump is then operative to circulate the transfer fluid from the solar array through the heat exchanger whereby the heat exchanger produces steam. An electric generator is provided with this electric generator being operative to generate electricity. A steam engine is in fluid communication with the steam from the heat exchanger and is operative in response thereto to operate the electric generator.

In one embodiment, the electric generator may be mechanically driven by the steam engine. In such instance, a gearbox may be interposed between the electric generator and the steam engine so that the output of the steam engine to increase the RPM input to the electric generator. In another embodiment, the electric generator is a pelton turbine that is operative to generate electricity in response to a flow of water therethrough. Here, a pump assembly is provided with the pump assembly being driven by the steam engine. The pump assembly is then operative to supply water to the pelton turbine thereby to product electricity.

Various subsystems can be used with the electric generation station of the present invention. For example, a thermal hot storage medium can be placed in selective communication with the solar array and with the heat exchanger. The thermal hot storage medium is operative to accept and store heat from the transfer fluid. Associated valves are provided so that heated transfer fluid may be directed through the thermal hot storage medium. In addition, a thermal fluid reservoir associated with the solar array may be provided. The thermal fluid reservoir can be selectively placed in communication with the solar array and the heat exchanger. The thermal fluid reservoir is then selectively operable to store transfer fluid therein. Again, appropriate valves are provided to direct the transfer fluid into and away from the thermal fluid reservoir.

If desired, a low temperature turbine generator may be placed in series fluid communication with the steam engine with the steam engine be located upstream with the low temperature turbine. Here, steam is first passed through the steam engine as a primary power source. Thereafter, the steam, now having a reduce temperature, can be passed through the low temperature electric turbine to generate secondary power therefrom. If desired, a condenser can be placed in fluid communication with a low temperature electric turbine and the heat exchanger with the condenser being located downstream with the low temperature electric turbine. Water from the condenser is then returned to the heat exchanger where it may be reheated into steam as described above.

Where a pelton turbine is employed as the electric generator, the pelton turbine may be in direct fluid communication with the pump assembly such that the pump assembly forces water directly through the pelton turbine. A water supply reservoir may be associated with the pump assembly and is operative to supply water to the pump assembly and receive water from the pelton turbine. Here, if desired, a water storage reservoir may be located at an elevation above the pelton turbine. The pump assembly may then be operative to pump water from the supply reservoir to the storage reservoir whereby stored water may be flowed under gravitational force through a large diameter water conduit back to the supply reservoir. The pelton turbine is then associated with the water conduit and is operative to generate electricity in response to a flow of water through the conduit.

Such storage reservoir is located at least an elevational distance of about 90 meters above the pelton turbine. If desired, the storage reservoir may be located at least an elevational distance of about 270 meters above the storage reservoir. Here, a set of pelton turbines is associated with the water conduit, with each pelton turbine being located at a different elevation so that they are arranged in series. The stored water may flow sequentially through each of the pelton turbines in the set. The pelton turbines in the set may be spaced in elevational distance from one another that is about 90 meters so that the flowing water may reach a high velocity approaching its terminal velocity. Storage valves are provided and are operative to selectively release water from the storage reservoir.

Where a storage reservoir is provided, a plurality of parallel water conduits may be employed with each conduit having a pelton turbine associated therewith. Again, either one or a set of pelton turbines may be associated with each water conduit, depending upon the elevation of the storage reservoir relative to the supply reservoir.

The present invention also contemplates a method of producing electricity employing the steps of the systems noted above. Broadly, though, the method of generating electricity includes a first step of heating a thermal transfer fluid by means of a solar array to produce a heated thermal transfer fluid at a first selected temperature. The heated thermal transfer fluid in then used to produce steam at a second selected temperature. The steam, in turn, is used to pump water from a first elevation to a second elevation that is gravitationally higher than said first elevation. This water may then be flowed from the second elevation back to the first elevation, and this flowing water is employed to generate electricity.

With greater detail, this general method may be enhanced by additional optional steps. For example, the first selected temperature is about 730° F., and the second selected temperature is about 430° F. The second elevation is at least about ninety meters higher than said first elevation, but may be at least about two hundred seventy meters higher than said first elevation. In any event, the step of producing electricity is accomplished by an electric generator interposed in the flowing water, and in the latter case, the step of producing electricity is accomplished by a plurality of spaced-apart electric generators interposed in series in the flowing water. The electric generators can be pelton generators.

The method may also include the step of holding water at the second elevation until the occurrence of a pre-determined event. Here, the pre-determined event can be correlated to the spot price for electricity. If desired, the method may include either the step of selectively storing heat from the heated thermal transfer fluid and/or the step of using said steam for the secondary generation of electricity after it has been used to pump water from the first elevation to the second elevation.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention broadly concerns electric generation systems and stations to produce electricity for supply to a power grid. More particularly, the present invention is directed to a solar powered electric generation system or station. The present invention particularly concerns an electric generation station and method employing solar power in conjunction with elevated water storage so as to supply electricity during both day and night or to supply electricity at times of high peak demand.

A. Simplified Systems

Figure 1A:
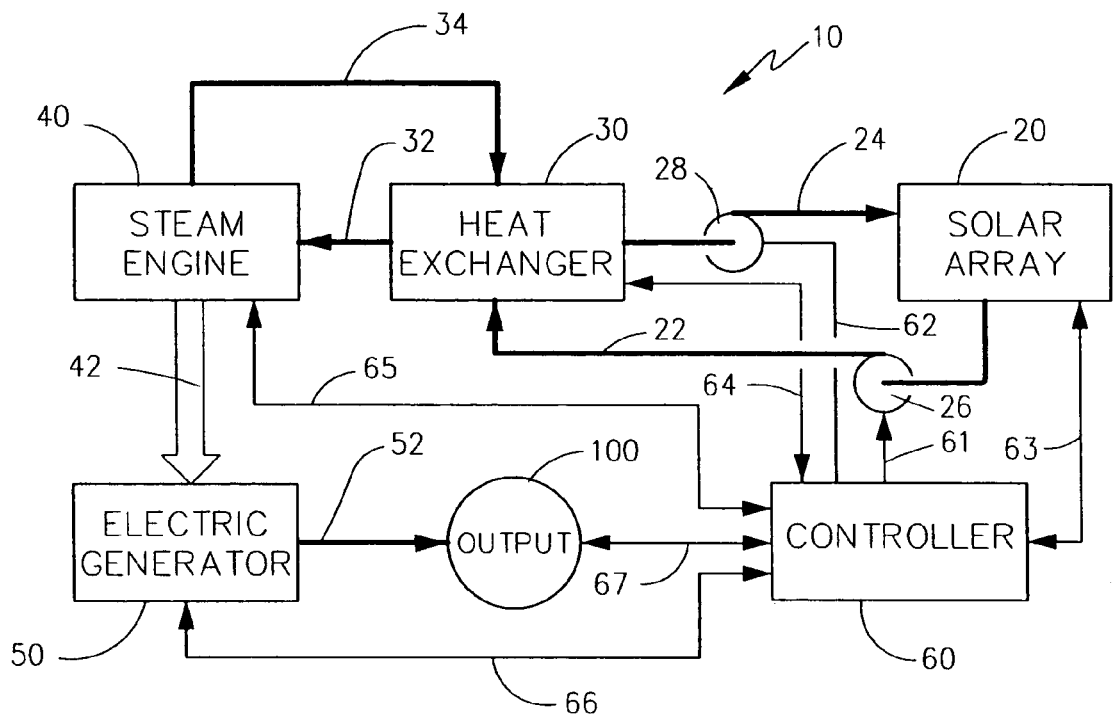
FIG. 1(a) is a diagram showing a simplified electric generation station according to a first embodiment of the present invention.
Figure 1B:
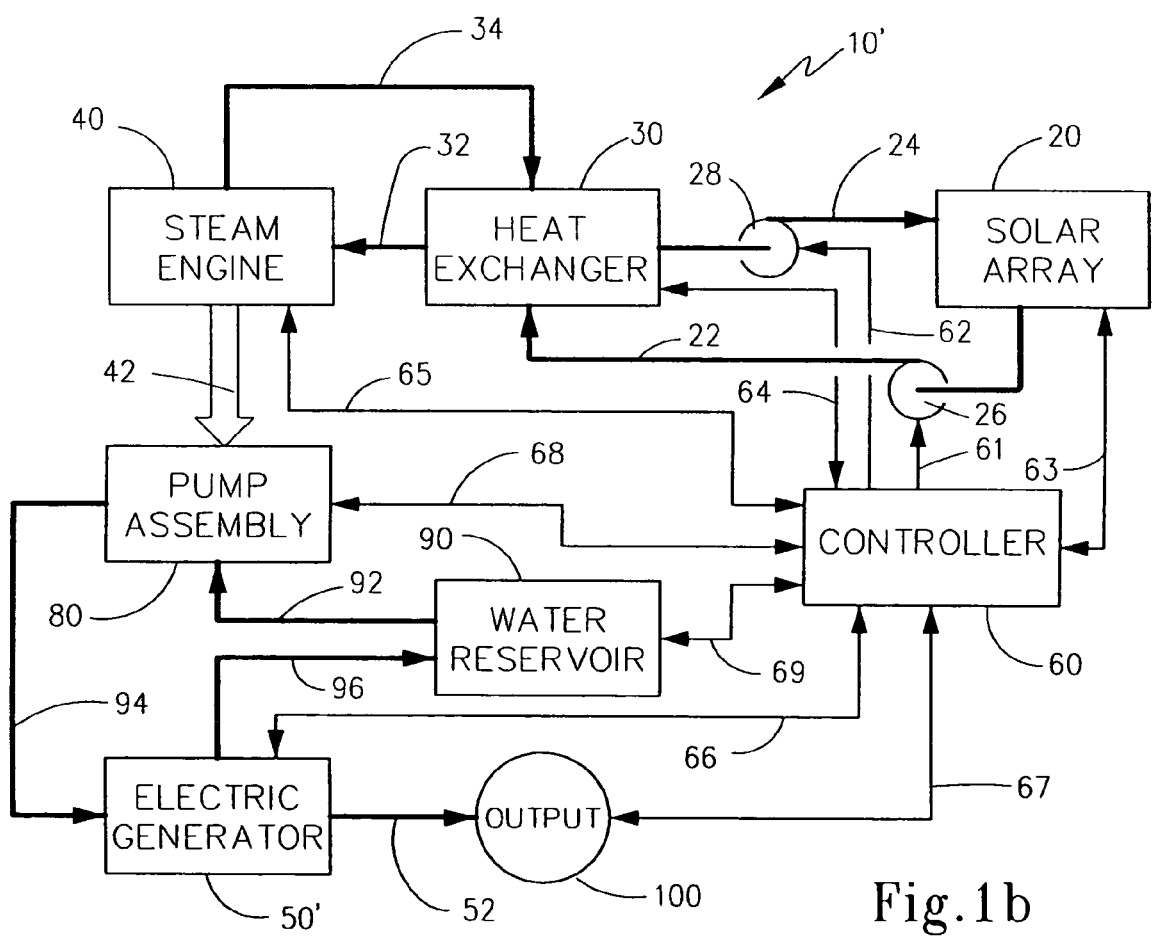
FIG. 1(b) is a diagrammatic representation of a second embodiment of the simplified electric generation station according to the present invention, here showing the use of a pump assembly and a water supply reservoir in conjunction therewith.

In order to introduce the electric generation station according to the present invention, reference may be made first to FIGS. 1(a) and 1(b). In FIG. 1(a), a diagram of a simplified electric generation station is illustrated. Here, electric generation station 10 includes a solar array 20 that is provided with a transfer fluid that is adapted to be heated by incident solar radiation, as is known in the art. Solar array 20 is in fluid communication through suitable conduits 22 and 24 with a heat exchanger 30. Pumps 26 and 28 are provided to circulate heated transfer fluid between solar array 20 and heat exchanger 30. A controller 60 is provided and may be employed to activate pumps 26 and 28 by means of electrical control connections 72 and 74 associated therewith.

As will be described more thoroughly below, heat exchanger 30 is operative to receive heated transfer fluid from solar array 20 and to produce steam in response to the circulation of heated transfer fluid therethrough. The heated steam from heat exchanger 30 is supplied by means of steam pipe 32 to a steam engine 40. Steam engine 40 is operative to produce a mechanical output, at output 42. After steam is passed through steam engine 40, it is returned, by way of steam pipe 34 to heat exchanger 30.

In FIG. 1(a), the mechanical output 42 of steam engine 40 may be used to operate an electric generator 50 which produces electricity, at 52. This electricity is then output to a power grid, at output 100. Controller 60 may interface with solar array 20, heat exchanger 30, steam engine 40, electric generator 50 and output 100 in any desired manner through electric controls 64-68. These controls, for example, can be used to monitor temperature, mechanical operation parameters, such as RPM, electrical output, and the like, as is desired.

With reference now to FIGS. 1(b), the simplified system may also be used to operate an electric generator through a pump assembly. Here, again, the electric generation system or station 10' employs a solar array 20, a heat exchanger 30, a steam engine 40 and a controller 60 to control the system. Heated transfer fluid from solar array 20 is pumped through heat exchanger 30 by means of conduits 22 and 24 with the heated fluid being driven by pumps 26 and 28. Steam from heat exchanger 30 is circulated through steam engine 40 by means of heat pipes 32 and 34, as above.

Here, however, the mechanical output 42 of steam engine 40 is utilized to drive a pump assembly 80 which has a water reservoir 90 associated therewith. Upon operation, pump assembly 80 is operative to circulate water from reservoir 90, by way of water conduit 92, and force the water by way of water conduit 94 through an electric generator 50' which in this embodiment is selected to be a pelton turbine generator. The water is then returned by way of water conduit 96 to water reservoir 90. The output 52 of electric generator 50' is then supplied to the output power grid 100, as before. Controller 60 interfaces with the operative components of this system illustrated in FIG. 1(b) as before. Here, however, additional electric controls 68 and 69 are provided for interfacing with pump assembly 80 and water reservoir 90 to monitor parameters thereof. For example, the water level in water reservoir 90 may be monitored by controller 60 or any other parameter that is desired.

With the general electric generation system of the present invention now being understood, it is helpful to discuss the particular components used in electric generation station 10 or 10':

1. Solar Array

It should be understood that the present invention may work with a variety of solar arrays available from commercial sources. It is desirably, however, that the solar array be a parabolic concentrator trough that is able to concentrate sunlight approximately eighty-two times onto a pipe that runs to the center of the trough. In such solar arrays, a pipe having a diameter of approximately 3.5 to 4.0 centimeters with this pipe being painted black with a high temperature black paint such as that known as solcoat. The parabolic mirror trough should be supported by a framework; here a framework of angular steel may be employed, as is known in the art. Moreover and as is also known, the collector array can have a single axis so that the trough may be able to follow the track of the sun across the sky from morning to night. Such solar arrays are available, for example, from Solar Genics of Golden, Colorado, Soele of Jerusalem, Israel or Five Star Engineering of Boulder, Colo.

These parabolic troughs typically have an efficiency of around 80 percent (sun/heat) depending upon the time of year and are capable of heating the transfer fluid to a temperature of about 730° F. Moreover the parabolic troughs selected for the electric generation of the present system should be selected to produce on the order to 200 BTU's per square foot. The amount of square footage of the solar array according to the present invention, of course, will depend upon the size of the site to be designed. Such arrays may be anywhere from a few thousand square feet to several million square feet, again depending upon the wattage output of the electric generation station desired.

The heat transfer fluid in the solar array should be a suitable high temperature transfer fluid, such as Therminol VP-1 vapor phase/liquid phase heat transfer fluid. Upon being heated, it is circulated through the heat exchanger by means of conduits 22 and 24 which should be insulated to prevent heat loss. The fluid is acceptable for use at temperatures of 730° F.

2. Heat Exchanger

Again, numerous heat exchangers may be employed with the present system, but the exemplary embodiment utilizes a three-stage heat exchanger 30 in order to increase efficiencies. Suppliers of such three-stage heat exchangers include English Boilers of Trenton, New Jersey, Nebraska Boiler of Lincoln, Nebr., Applied Thermodynamics of White Plains, New York, and Graham Engineering of Batavia, New York.

Figure 2:
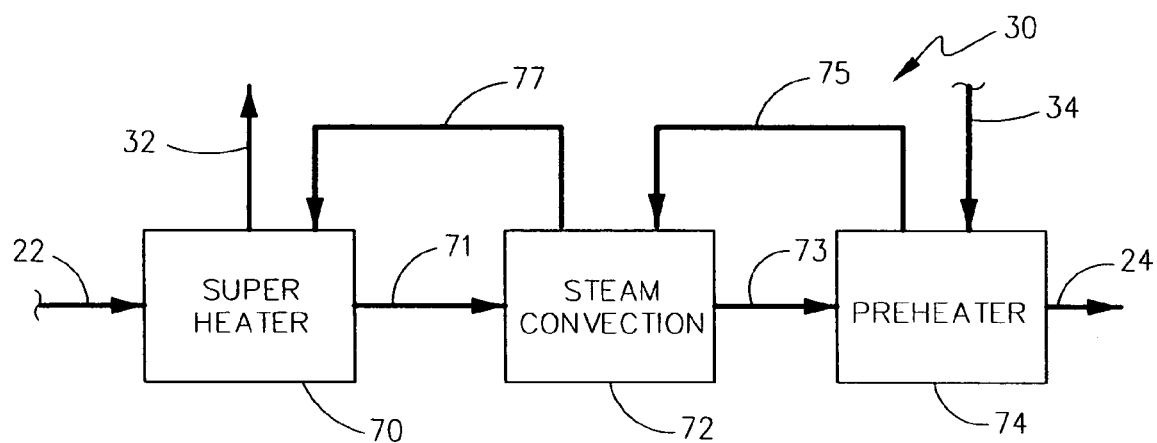
FIG. 2 is a diagrammatic view of a three-stage heat exchanger according to the prior art used in the exemplary embodiment of the present invention.

An diagrammatic illustration of such a three stage heat exchanger 30 is shown in FIG. 2. Here, the thermal transfer fluid, at the temperature of about 730° F., is introduced first into a superheater 70 via conduit 22. After passing through superheater 70 conduit 71 conveys the transfer fluid to steam convection stage 72. Next, conduit 73 conveys the transfer fluid to preheater 74. The fluid is then returned to the solar array by way of conduit 24, as noted above.

Water and steam flow through heat exchanger 30 in the opposite direction. Water at a temperature of about 112° F. is introduced by conduit 34 into preheater 74 where it is turned to steam at a temperature of about 392° F. This steam is conveyed by steam pipe 75 to steam convection stage 72 where it is heated to a temperature of about 422° F. Thereafter, the steam is conveyed to superheater 70 via steam pipe 77 where it is further heated to a temperature of about 430° F. The superheated steam is then discharged to steam pipe 32 to be presented to the steam engine.

It may be appreciated that the superheater 70 received the heat transfer fluid at its peak temperature, and this heat exchanger is operative to pass about 4578 gallons per hour of transfer fluid therethrough. After heating the steam in the superheater phase, the temperature of the transfer fluid drops to about 620° F. and enters then steam convection stage at the lower temperature. Here it gives up additional heat to the steam from the preheater and drops to a temperature of about 410° F. After passing through the preheater to initially convert the water to steam, the transfer fluid drops to a temperature of about 380° F.

3. Steam Engine

Figure 3:
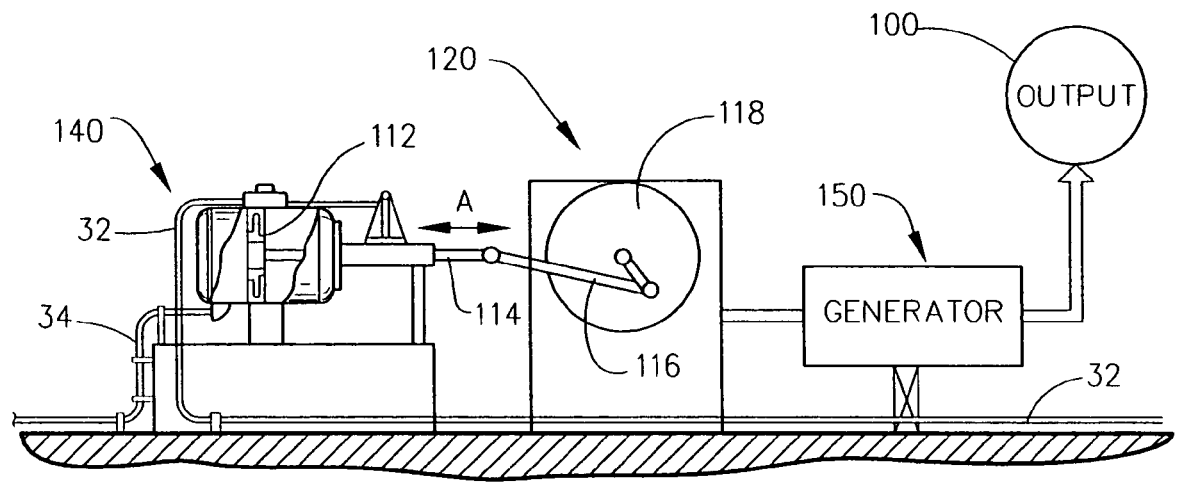
FIG. 3 is a diagrammatic view of a steam engine according to the prior art used in association with a gearbox and electric generator used in the present invention.

With reference to FIG. 3, a diagram of a suitable steam engine with electric generator used with electric generation station 10 as shown. Here, electric generator 110 includes a housing that contains a steam driven piston 112 that is operated by steam from steam pipe 32 so as to reciprocate drive rod 114 in the direction of arrow "A". Steam is exhausted from steam engine 110 through steam pipe 34 as discussed above. Drive rod 114 is connected to a crank arm 116 that is pivotally attached to a drive wheel 118 of a gear box 120. Typically, a steam engine such as steam engine 110 has an output site of 24 cycles per minute so that wheel 118 will be driven at approximately 24 RPM. Electric generator 150, of the type discussed below, typically has an input 152 that is to be turned at approximately 900 RPM's in order to produce electrical output at output 100. Accordingly, gearbox 120 should have a ratio in a range of 1:30 to 1:40.

Steam engine 40 may, for example, be a duplex reciprocating steam engine such as that used in conjunction with a water pump marketed by the Union Pump Company of Battle Creek, Michigan, as noted below with respect to the pump assembly. Here, however, only the steam engine stage is employed.

4. Electric Generator

With respect to the system shown in FIG. 1(a) the electric generator 50 is driven directly by steam engine 40 to produce electricity. Numerous electric generators would be suitable for this application. These include that sold by Marathon Electric of Wausau, Wisconsin under the trademark MagnaMax DVRO®. Such generators have ratings of 118 to 2370 kilowatts at 60 Hertz.

5. Pump Assembly

With respect to electric generation system 10' shown in FIG. 1(b), the output of steam engine 40 is utilized to drive pump assembly 20. In construction, the steam engine 40 and the pump assembly 80 may be a steam driven double acting duplex piston system such as that available from Union Pump of Battle Creek, Michigan. The desired pump should provide between 800–2080 gallons per minute of water that is 600 to 2000 pounds per square inch depending upon the plant size and application. Such pumps require an inlet pressure of between 300 and 400 pounds per square inch at steam temperatures of between 400 and 500 degrees Fahrenheit. The steam requirements for such pumps are approximately 11,600 pounds per hour at 430° F.

As noted, a water reservoir 90 is associated with pump assembly 80. This water reservoir can be any convenient tank such as storage tanks available from Eton Metal of Denver, Colo. or Nebraska Boiler of Lincoln, Nebr. The capacity of such water reservoirs should be approximately 75,000 to 100,000 gallons. In order to increase the weight of the water, salt water may be employed. To this end, then, water reservoir 90 should be constructed to hold salt water without significant degradation.

6. Electric Generator for Pump Assembly

Again with reference to FIG. 1(b), where the steam engine 40 is used to drive a pump assembly, the electric generator 50' may conveniently be a pelton wheel generator assembly such as that available from Calder AG of Egilswil, Switzerland. An alternative supplier is Bitterroot Power of Boise, Id. As is known, low speed continuous pelton wheel generators operating at a water pressure of 600 pounds per square inch produce approximately 1.5 megawatts per hour with through put of water on the order of 232,500 gallons per hour. From the foregoing, and depending upon the power output desired, the electric power generation system can be customized by selecting the power output and matching the power output by one or more pelton wheel generators. After determining the number of pelton wheel generators, the throughput water requirements may readily be determined by the ordinarily skilled artisan which then dictates the requirements of the pump assembly and one or more steam engines associated with the pump assembly. This in turn determines the number of heat exchangers necessary and the square footage of the solar array to provide the suitable power.

B. Integrated Systems

Figure 4:
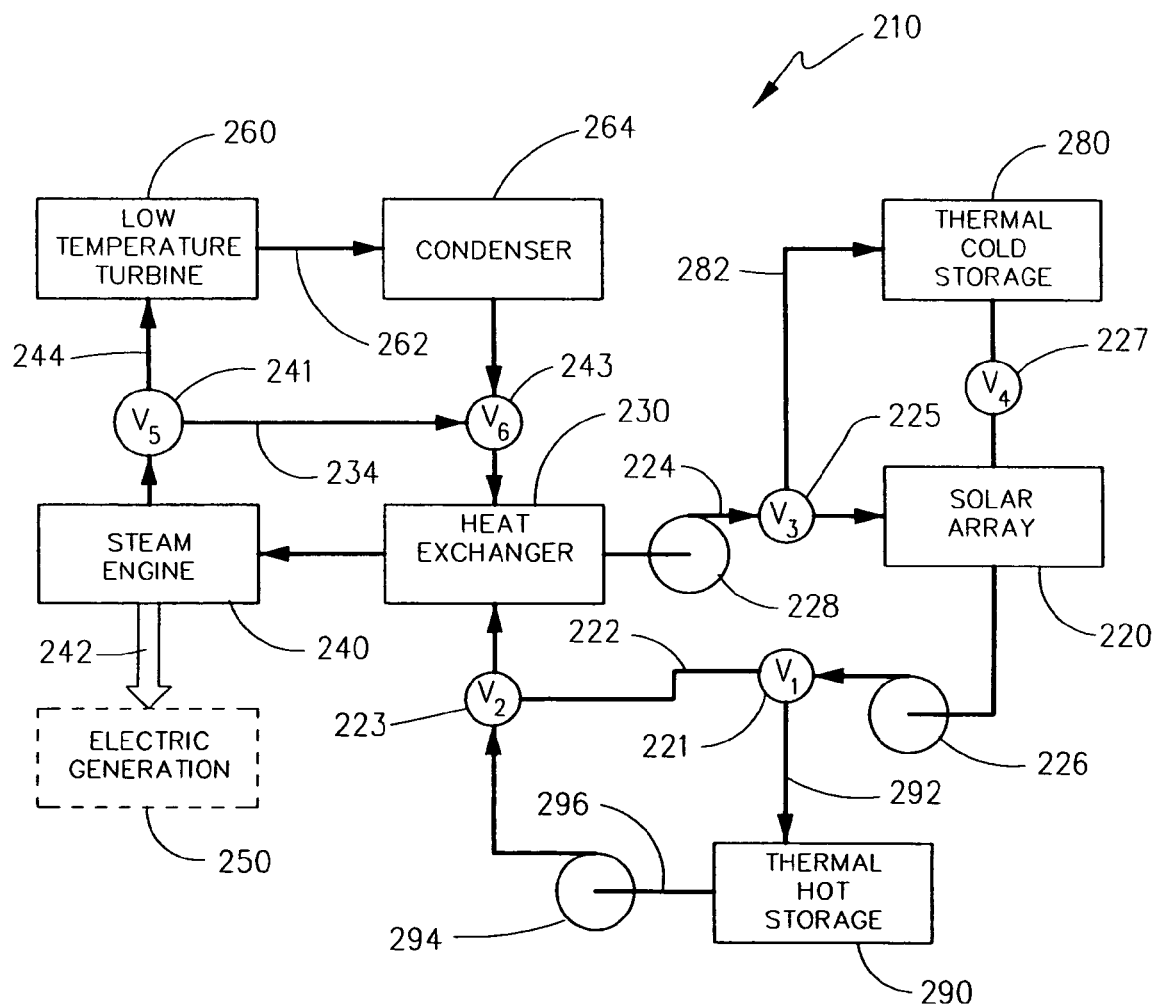
FIG. 4 is a diagrammatic view of a portion of the electric generation system showing the optional thermal hot storage and thermal cold storage therefor.

With reference now to FIG. 4, three optional addition to the basic electric steam generation station of FIGS. 1(a) and 1(b) may now be appreciated. In FIG. 4 electric generation station 210 includes a solar array 220 and a heat exchanger 230 that are provided with optional thermal cold storage 280 and optional thermal hot storage 290.

In a first mode of operation, heated thermal fluid from solar array 230 is driven by pump 226 through conduit 222 through heat exchanger 230. To accomplish this, valve 221 and valve 223 are placed in a state to place heat exchanger 230 in direct fluid communication with solar array 220. After giving up its heat, the transfer fluid may be driven back to solar array 220 through conduit 224 by means of pump 228. To this end, valve 225 is placed in a state so as to allow the fluid from heat exchanger 230 to directly communicate with solar array 220.

In the event that the thermal fluid is desired to be stored after the heat is exhausted, valve 225 may be switched to direct fluid out of conduit 224 to a thermal cold storage reservoir 280 with this fluid being directed through conduit 282 to the thermal cold storage 280. At such time that the thermal fluid is to be withdrawn from thermal cold storage 280, valve 227 may be opened so that thermal fluid from thermal cold storage 280 is accessible by solar array 220.

Similarly, a thermal hot storage may be provided in association with solar array 220 and heat exchanger 230. Here, valve 221 may be placed in a state to redirect hot thermal exchange fluid from solar array 220 into thermal hot storage 290 by means of conduit 292. Pump 294 is provided to pump heated fluid from thermal hot storage 290 to heat exchanger 230 by way of conduit 296. To this end, valve 223 may be controlled to permit introduction of the hot fluid from thermal hot storage 290 and a heat exchanger 230.

In the embodiment of the present invention shown in FIG. 4, the thermal hot storage is an insulated concrete tank that holds between 50,000 and 100,000 gallons of transfer fluid, depending upon the size of the facility. A storage medium may be contained by the tank, and several options are available for such storage medium. In one aspect of the present invention, the storage medium could be thermal transfer fluid itself. To this end, thermal transfer fluid from thermal cold storage 280 would be circulated through solar array 220 where it is heated and then directed for storage into thermal hot storage 290. Thereafter, when desired, the heated fluid would be passed through heat exchanger 230 and returned either to thermal cold storage 280 or recirculated through solar array 220.

Alternatively, a storage medium may be contained in thermal hot storage 280 with this storage medium being of a type known in the art. For example, heat from the heated transfer fluid may be transferred to a molten salt heat storage or heat storage by way of a limestone mixture. After giving up its seat to the storage medium, the transfer fluid may be returned to the thermal cold storage 280 or to the solar array 220 for further heating. Thereafter, at a selected controllable time, the transfer fluid may be recirculated through thermal hot storage 290 and utilized by heat exchanger 230 to produce steam.

With continued reference to FIG. 4, it may be seen that an alternative secondary generation of electricity may also be provided in conjunction with heat exchanger 230 and steam engine 240. Here, as noted above, exiting steam engine 240 may be returned to heat exchanger 230. To this end, valves 241 and 243 may be set in a state to place steam engine 240 in communication with heat exchanger 230 through conduit 234. In this alternative structure, however, valves 241 and 243 may be redirected so that steam from steam engine 240 is passed by way of conduit 244 to a low temperature turbine 260 which may be used to generate electricity from heat recovery from the steam engine. Suitable low temperature turbines are those that may be supplied by Rotoflow Turbines of New York, N.Y. or by Delta Dynamics of Denver, Colo. Since exhaust from the steam engine 240 is approximately 390 degrees Fahrenheit at 30 to 40 pounds per square inch, the steam may be depressurized and fed into this type of condensing type turbine. Steam from the low temperature turbine 260 may be then conveyed by conduit 262 to a condenser 264 where it may be returned to heat exchanger 230 for reheating. Although low temperature turbine 260 is typically of reduced efficiency, such as approximately 25%, it nonetheless can supply and auxiliary electrical output for the system, since it is necessary to condense the steam into water for reintroduction into the heat exchanger.

In any event, as is shown in FIG. 4, the mechanical output 242 of steam engine 240 may be used for electrical generation, designated as 250, in either of the manner described with respect to FIGS. 1(a) or 1(b). That is, the mechanical output may be used to directly drive an electric generator such as electric generator 50, or may be used to drive a pelton turbine such as electric generator 50' by way of pump assembly 80.

Figure 5:
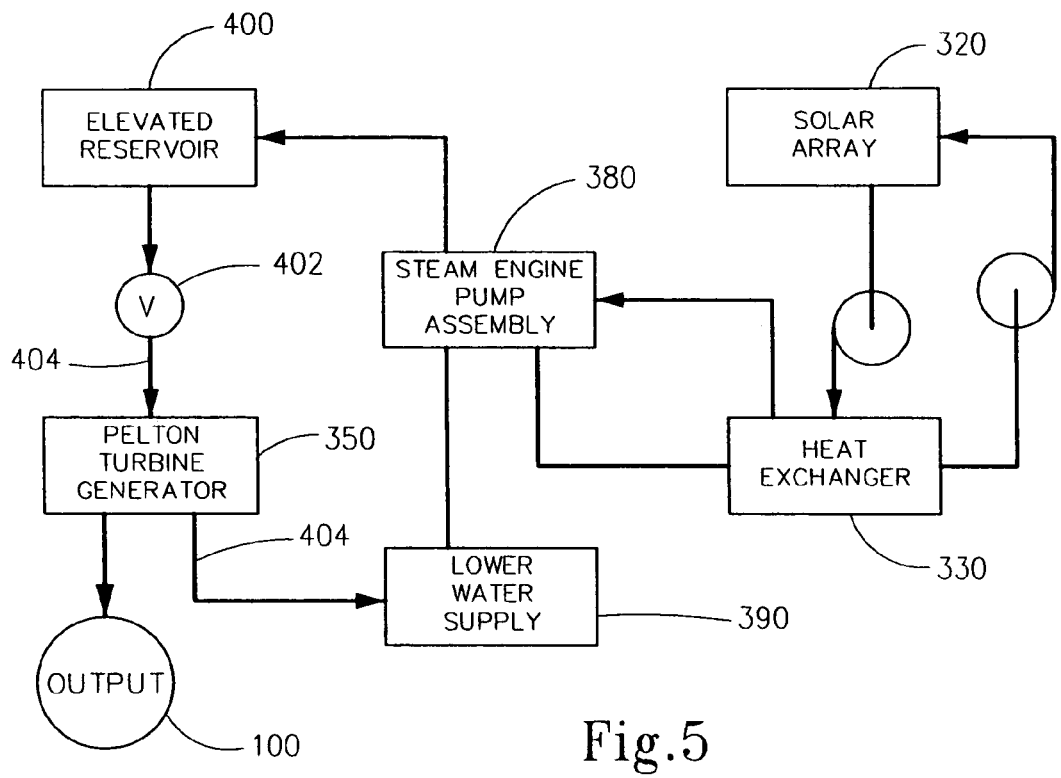
FIG. 5 is diagrammatic view showing a simplified electric generation station according to the present invention employing an elevated reservoir.

With reference now to FIG. 5, another aspect of the present invention may be appreciated. Here, solar array 320 provides heated thermal fluid to heat exchanger 330 in the manner described above. Heat exchanger 330 provides heated steam to the combination steam engine pump assembly 380 which acts to pump water from a water supply 390 to an elevated reservoir 300. Elevated reservoir 400 should be at an elevation that is at least about 90 meters above lower water supply 390 and has an outlet controlled by valve 402 for a large water conduit 404. Conduit 404 places elevated reservoir 400 in fluid communication with lower water supply 390, and valve 402 may be selectively controlled to permit or prohibit water from flowing through conduit 404.

Conduit 404 is preferably a high capacity flow pipe or conduit, such as a steel conduit having an internal diameter of about one foot. One or more pelton turbines, such as pelton turbine 350, may then be interposed in this flow line, preferably at an elevation comparable to lower water supply 390. Thus, kinetic energy from the water from elevated reservoir 400 when valve 402 is opened may pass through pelton turbine 350 to produce electricity at output 100. If desired, a plurality of pelton generators 350 may be placed parallel to one another through a plurality of conduits 404 provided for higher capacity generation of electricity.

Moreover, it should be appreciated that the selection of the elevation of reservoir 400 should be selected to allow the falling water to reach a velocity near to its terminal velocity and, thus, attain maximum kinetic energy as it passes through pelton turbine 350. To this end, also, as noted above, the water supply may be salt water to increase its mass and therefore its kinetic energy.

Figure 6:
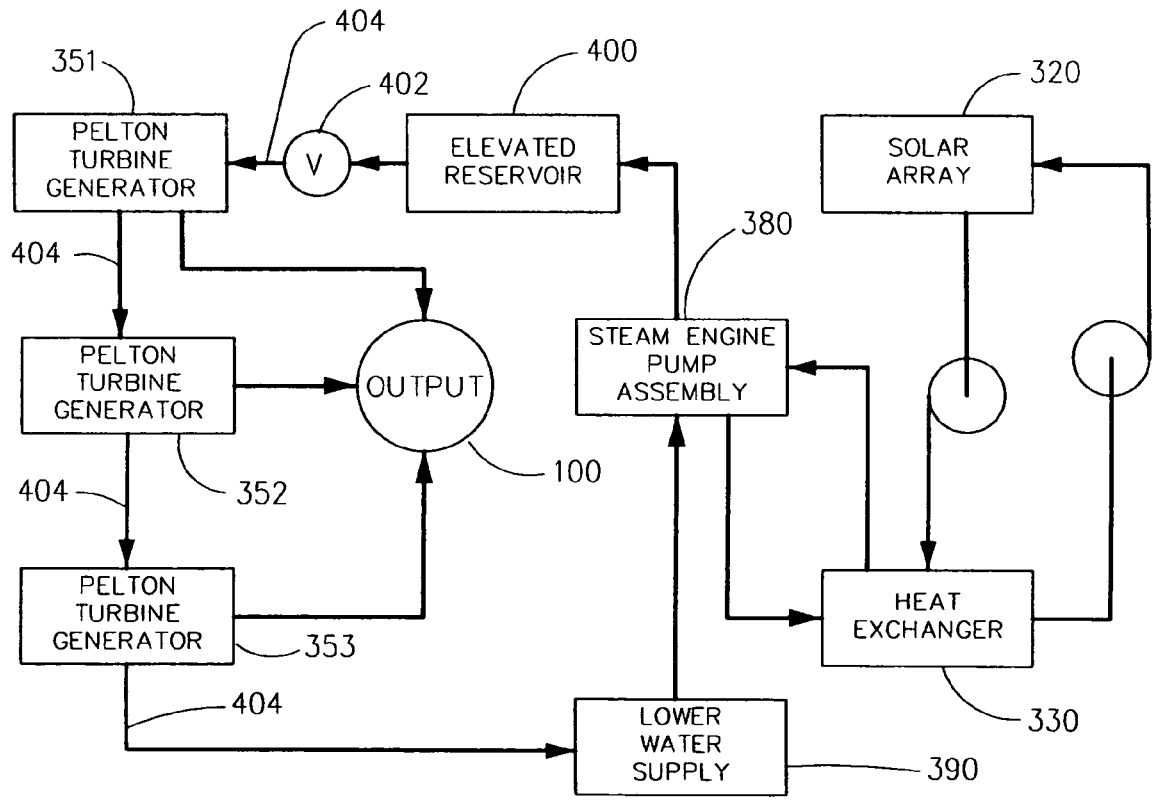
FIG. 6 is a diagrammatic view, similar to FIG. 5, but illustrating an elevated reservoir with multiple stages of pelton turbines in series therewith.

With reference to FIG. 6, it may be appreciated that further modifications may be made to the embodiments shown in FIG. 5 by providing an elevated reservoir that is located, for example, about 270 meters above lower water supply 390. Here, a series of three pelton turbines 351, 352 and 353 may be placed in series in conduit 404 with each pelton turbine being spaced apart by approximately 90 meters vertically from an adjacent pelton turbine. When valve 402 is open, and water is released from reservoir 400 into conduit 404, the water will first fall through pelton turbine 351 to generate electrical output at output 100. Naturally, the velocity of the water will be significantly reduced as it passes through pelton turbine 351 but, after leaving pelton turbine 351, it will again gain velocity by falling an additional 90 meters to reach its near terminal velocity once again. At this point it is introduced to pelton turbine 352 which produces electrical output at 100. Water leaving pelton turbine 352 then falls an additional 90 meters where it is passed through pelton turbine 353 with the water then being returned to lower water supply 390 for recirculation to elevated reservoir 400 by pump assembly 380. Naturally, as was the case with the embodiment shown in FIG. 4, a plurality of sets of pelton turbines 351, 352 and 353 can be placed in parallel to one another as desired for a particular application.

From the foregoing, it should also be appreciated that elevated reservoirs 400 may a naturally occurring lake or an artificially created holding pond or the like. Likewise, lower water supply 390 may be a naturally occurring water source or artificially created holding pond. If desired, suitable coverings may be provided to reduce evaporation from these water storage areas.

Figure 7:
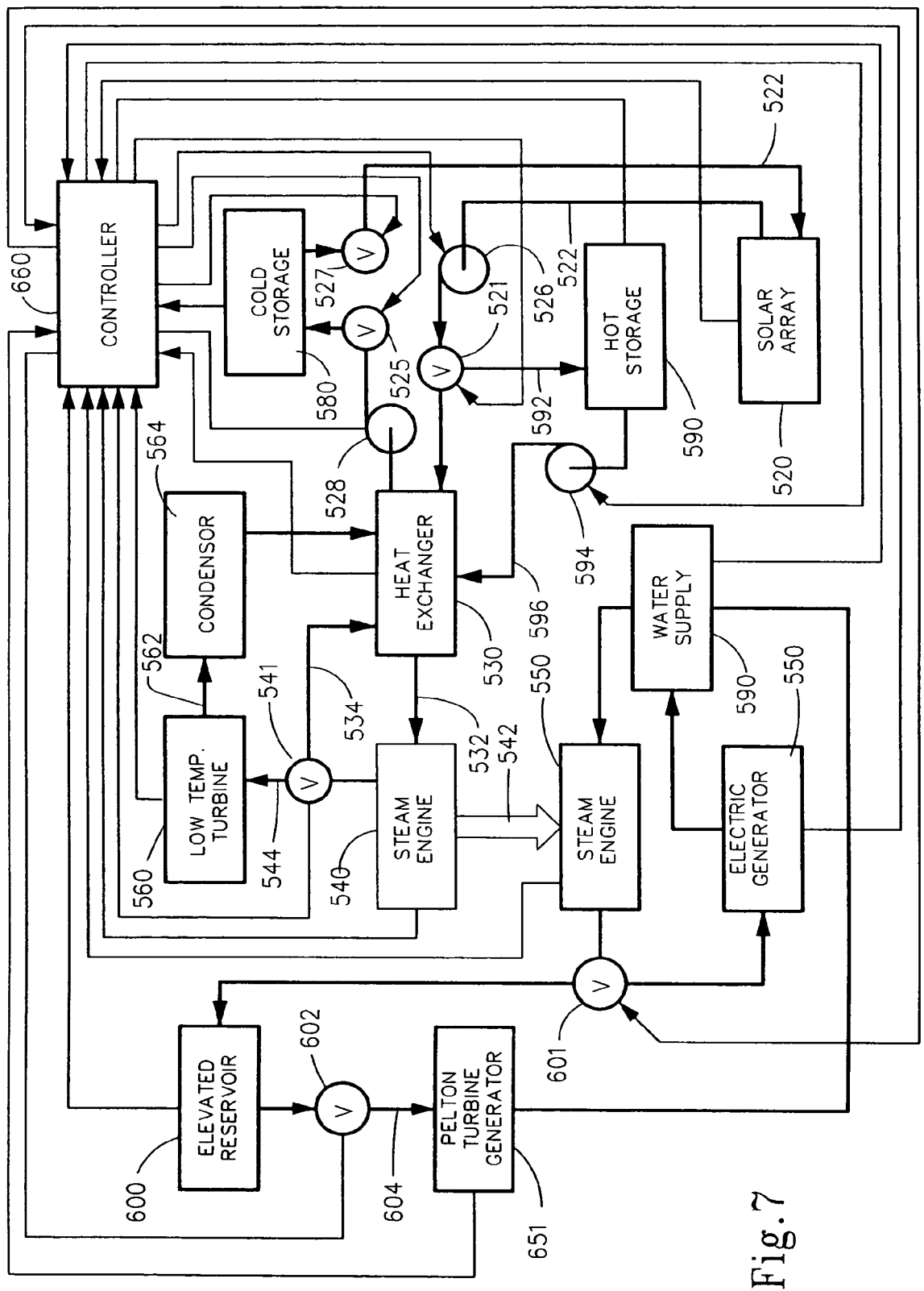
FIG. 7 is diagrammatic view showing an integrated electrical generation system according to the present invention.

Finally, with reference to FIG. 7, an integrated electric generation station 510 is illustrated to include the many varied aspects of the earlier described embodiments. Here, heat transfer fluid may be drawn from cold storage 580 by opening valve 527 so that this fluid may be pumped through solar array 520 by means of pump 526 so that it can be presented to heat exchanger 530. To this end, valve 521 is opened to allow fluid to communicate from solar array 520 to heat exchanger 530. Pump 528 can then, if desired, return the fluid to cold storage 580 by the operation of valve 525. However, once the heated fluid is initially heated, it is desirable that it be recirculated through solar array 520 and not returned to cold storage 580. Accordingly, valves 525 and 527 can redirect fluid from heat exchanger 530 directly to solar array 520 through conduit 522. At such time that it is desired to restore the thermal transfer fluid in the cold storage 580, valve 525 may be employed to divert the fluid into cold storage 580.

Instead of directing the heated thermal exchange fluid through conduit 522, valve 521 may direct the transfer fluid through conduit 592 to hot storage 590. The heated thermal transfer fluid may be stored in hot storage 590 or may give up its heat to a selected thermal storage medium, such as molten salt, the limestone mixture, or other storage medium now known or hereinafter developed. In any event, when heat is desired to be recovered from hot storage 590, pump 594 may be activated so that fluid is pumped from hot storage 590 and introduced into heat exchanger 530.

Heat given up the transfer fluid at heat exchanger 530 is then used to produce steam that is presented through heat pipe 532 to steam engine 540. Steam exiting steam engine 540 may either be returned to heat exchanger 530 by way of heat pipe 534 or, alternatively, directed by valve 541 through steam pipe 544 to a low temperature turbine 560 for the production of auxiliary electricity. This steam is then conveyed by conduit 562 to condenser 564 where it is then returned to heat exchanger 530.

Regardless of the configuration of the cold storage, hot storage and low temperature turbine, the primary output of 542 of steam engine 540 may be used either to operate an electric generator such as that described with electric generator 50 or, in this embodiment, is used to operate a pump assembly 580 from water supply 690 either to a pelton turbine 550 or to an elevated reservoir 600 as controlled by valve 601. If the water is directed through pelton turbine 550, it is then redirected into water supply 690 for recirculation by pump assembly 550. Where the water is pumped to elevated reservoir 600, the discharge of water from elevated reservoir 600 is controlled by valve 602 so that water may then flow through conduit 604 to one or more pelton turbines 651.

Controller 660 provides suitable monitoring and control of this operation and to this end, is contemplated to be a computerized control that can selectively operate the various valves and pumps of the system based upon the input of temperature, water levels and the like. To this end, controller 660 may be programmed as desired to monitor and operate the system.

Figure 8:
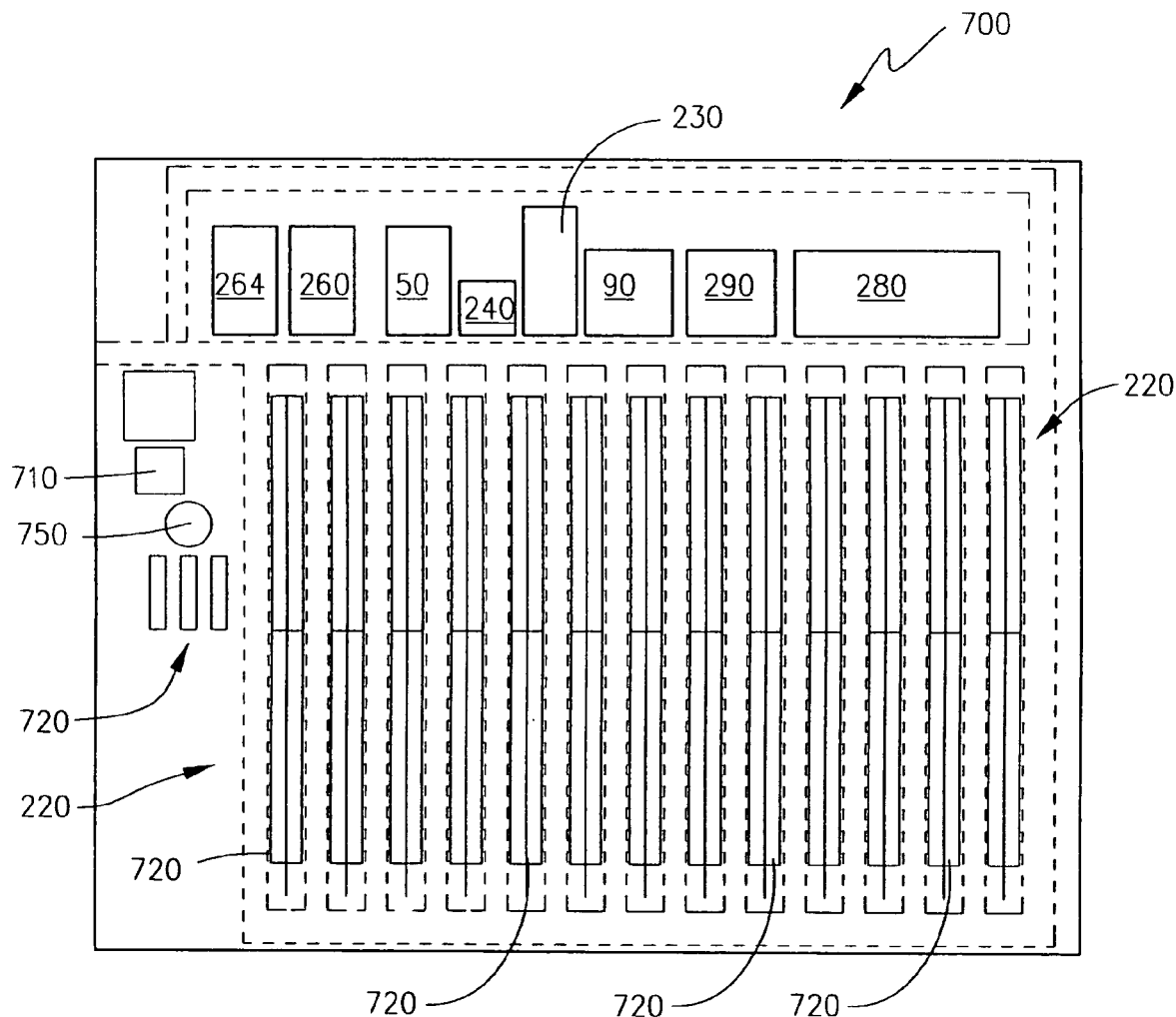
FIG. 8 is a diagrammatic view of a power generating station according to one embodiment of the present invention.

Turning, now, to FIG. 8, the layout of a representative electric generation station 700 of the type incorporating the system similar to FIG. 4. Here, solar array 220 includes fourteen trough-shaped solar panels 720 which are approximately 300 feet in length and which are elevated toward the sun at an angle with respect to the horizontal of approximately 10 to 20 degrees. Electric generation station 700 fits on approximately 6 acres of land and employs a single heat exchanger 230 which powers a single steam engine 240 that turns primary generator 50 to produce electricity. Steam then enters low temperature turbine 260 to produce a secondary stage of electricity, and then the steam is condensed by condenser 264 so that water is returned to a holding pond, such as water reservoir 90 (FIG. 1(b)) Thermal hot storage 280 is provided to store hot transfer fluid from solar array 220, and thermal cold storage 280 is provided to store the cooled thermal transfer fluid not being used.

In addition, the generation station 700 can include a control office 710 that has its own power supply in the form of a smaller solar array 720 that operates through a smaller generation station 750 of any convenient type as hereinbefore described. This facility, utilizing the equipment described above, provides for an output of approximately 2.2 megawatts per hour.

One advantage of the present invention is its ability to employ the economics of higher price for peak demand electricity. During daylight hours, solar energy collected by solar array 520 may selectively be used to generate electricity directly, such as by electric generator 550 or to pump water from water supply 690 to elevated reservoir 600 should the price point of electricity be lower than that desired. At any time the price of electricity rises to a selected threshold, controller 660 may open valve 602 so that electricity generated by pelton turbines 651 may be sold at a higher price. This substantially increases the economics of the system since the price of electricity at peak demand times can be many multiples the price of electricity at off peak times.

Further, the storage of water in reservoir 600 may be used to generate electricity by way of pelton turbine 651 during nighttime hours when energy cannot be captured by solar array 520. As an alternative, heat may be stored in hot storage 590 for production of electricity either during nigh time hours or at high peak demand times.

In the foregoing description, it should be appreciated that the present invention contemplates a method of producing electricity the may include any of the steps inherent in the above-describe systems. Broadly, though, the method of generating electricity includes a first step of heating a thermal transfer fluid by means of a solar array to produce a heated thermal transfer fluid at a first selected temperature. The heated thermal transfer fluid in then used to produce steam at a second selected temperature. The steam, in turn, is used to pump water from a first elevation to a second elevation that is gravitationally higher than said first elevation. This water may then be flowed from the second elevation back to the first elevation, and this flowing water is employed to generate electricity.

With greater detail, this general method may be enhanced by additional optional steps. For example, the first selected temperature is about 730° F., and the second selected temperature is about 430° F. The second elevation is at least about ninety meters higher than said first elevation, but may be at least about two hundred seventy meters higher than said first elevation. In any event, the step of producing electricity is accomplished by an electric generator interposed in the flowing water, and in the latter case, the step of producing electricity is accomplished by a plurality of spaced-apart electric generators interposed in series in the flowing water. The electric generators can be pelton generators.

The method may also include the step of holding water at the second elevation until the occurrence of a pre-determined event. Here, the pre-determined event can be correlated to the spot price for electricity. If desired, the method may include either the step of selectively storing heat from the heated thermal transfer fluid and/or the step of using said steam for the secondary generation of electricity after it has been used to pump water from the first elevation to the second elevation.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. An electric generation station, comprising:
   (A) a solar array including a transfer fluid and operative in response to solar energy to heat said transfer fluid;
   (B) a heat exchanger in fluid communication with the transfer fluid and operative to produce steam in response to circulation of heated transfer fluid therethrough;
   (C) a first pump operative to circulate the transfer fluid from said solar array through said heat exchanger whereby said heat exchanger produces steam;
   (D) an electric generator operative to generate electricity;
   (E) a steam engine in fluid communication with the steam from said heat exchanger and operative in response thereto to operate said electric generator;
   (F) a thermal fluid reservoir that can be selectively placed in communication with said solar array and with said heat exchanger, said thermal fluid reservoir selectively operable to store said transfer fluid therein; and
   (G) a low temperature electric turbine in series fluid communication with said steam engine, said steam engine being located upstream of said low temperature turbine whereby steam is first passed through said steam engine and thereafter through said low temperature electric turbine.

2. An electric generation station according to claim 1 wherein said electric generator is mechanically driven by said steam engine.

3. An electric generation station according to claim 1 including a gear box interposed between said electric generator and said steam engine.

4. An electric generation station according to claim 1 including a condenser in fluid communication with said low temperature electric turbine and said heat exchanger, said condenser being located downstream of said low temperature electric turbine.

5. An electric generation station according to claim 1 wherein said electric generator is a pelton turbine operative to generate electricity in response to a flow of water therethrough and including a pump assembly driven by said steam engine and operative to supply water to said pelton turbine.

6. An electric generation station according to claim 5 wherein said pump assembly is in direct fluid communication with said pelton turbine whereby said pump assembly forces water through said pelton turbine.

7. An electric generation station according to claim 5 including a water supply reservoir associated with said pump assembly and operative to supply water to said pump assembly and receive water from said pelton turbine.

8. An electric generation station according to claim 7 including at least one water storage reservoir located at an elevation above said pelton turbine, said pump assembly operative to pump water from said supply reservoir to said storage reservoir whereby stored water may flow under gravitation force through a water conduit back to said supply reservoir, said pelton turbine being associated with said water conduit and operative to generate electricity in response to a flow of water therethrough.

9. An electric generation station according to claim 8 wherein said storage reservoir is located at least an elevational distance of about ninety meters above the pelton turbine.

10. An electric generation station according to claim 8 wherein said storage reservoir is located at least an elevational distance of about two hundred seventy meters above the storage reservoir and including a set of pelton turbines associated with said water conduit and each located at different elevations and arranged in series whereby the stored water may flow sequentially through each of the pelton turbines in said set.

11. An electric generation station according to claim 9 wherein the pelton turbines in said set are spaced an elevational distance from one another that is about at least about ninety meters.

12. An electric generation station according to claim 8 including a storage valve controls operative to selectively release water from the storage reservoir.

13. An electric generation station, comprising:
   (A) a solar array including a transfer fluid and operative in response to solar energy to heat said transfer fluid;
   (B) a heat exchanger in fluid communication with the transfer fluid and operative to produce steam in response to circulation of heated transfer fluid therethrough;
   (C) a first pump operative to circulate the transfer fluid from said solar array through said heat exchanger whereby said heat exchanger produces steam;
   (D) an electric generator operative to generate electricity;
   (E) a steam engine in fluid communication with the steam from said heat exchanger and operative in response thereto to operate said electric generator; and
   (F) a low temperature electric turbine in series fluid communication with said steam engine, said steam engine being located upstream of said low temperature turbine whereby steam is first passed through said steam engine and thereafter through said low temperature electric turbine.

14. An electric generation station according to claim 13 including a condenser in fluid communication with said low temperature electric turbine and said heat exchanger, said condenser being located downstream of said low temperature electric turbine.

15. An electric generation station, comprising:
   (A) a solar array including a transfer fluid and operative in response to solar energy to heat said transfer fluid;
   (B) a heat exchanger in fluid communication with the transfer fluid and operative to produce steam in response to circulation of heated transfer fluid therethrough;
   (C) a first pump operative to circulate the transfer fluid from said solar array through said heat exchanger whereby said heat exchanger produces steam;

(D) an electric generator operative to generate electricity;

(E) a steam engine in fluid communication with the steam from said heat exchanger and operative in response thereto to operate said electric generator;

(F) a thermal fluid reservoir that can be selectively placed in communication with said solar array and with said heat exchanger, said thermal fluid reservoir selectively operable to store said transfer fluid therein; and (G) a thermal hot storage medium that can be selectively placed in communication with said solar array and with said heat exchanger, said thermal hot storage operative to accept and store heat from said transfer fluid.

* * * * *